United States Patent
Jafari et al.

(10) Patent No.: US 11,288,608 B2
(45) Date of Patent: Mar. 29, 2022

(54) SYSTEMS AND METHOD FOR A PROJECT MANAGEMENT PORTAL

(71) Applicant: ServiceNow, Inc., Santa Clara, CA (US)

(72) Inventors: Amir Vakili Jafari, Los Gatos, CA (US); Ankur Tayal, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/848,521

(22) Filed: Apr. 14, 2020

(65) Prior Publication Data

US 2021/0319389 A1    Oct. 14, 2021

(51) Int. Cl.
| | |
|---|---|
| *G06Q 10/06* | (2012.01) |
| *G06F 3/0483* | (2013.01) |
| *G06F 3/0482* | (2013.01) |
| *G06Q 10/10* | (2012.01) |

(52) U.S. Cl.
CPC ... *G06Q 10/063118* (2013.01); *G06F 3/0482* (2013.01); *G06F 3/0483* (2013.01); *G06Q 10/1097* (2013.01)

(58) Field of Classification Search
CPC ............ G06Q 10/00–50/00; G06F 1/00–21/00
USPC ................................................ 705/7.11–7.42
See application file for complete search history.

(56) References Cited

U.S. PATENT DOCUMENTS

| | | | |
|---|---|---|---|
| 6,002,396 A * | 12/1999 | Davies ................... | G06Q 10/06 715/763 |
| 6,321,229 B1 | 11/2001 | Goldman | |
| 6,598,078 B1 * | 7/2003 | Ehrlich ................... | H04L 43/00 709/224 |
| 6,609,122 B1 | 8/2003 | Ensor | |
| 6,678,714 B1 * | 1/2004 | Olapurath .............. | G06Q 10/10 718/104 |
| 6,944,622 B1 * | 9/2005 | Mitchell .............. | G06Q 10/103 |
| 7,020,706 B2 | 3/2006 | Cates | |
| 7,028,301 B2 | 4/2006 | Ding | |
| 7,114,154 B1 * | 9/2006 | Crohn ................ | G06Q 10/0633 718/100 |
| 7,131,037 B1 | 10/2006 | LeFaive | |
| 7,170,864 B2 | 10/2007 | Matharu | |
| 7,350,209 B2 | 3/2008 | Shum | |
| 7,502,747 B1 * | 3/2009 | Pardo ..................... | G06Q 10/06 705/7.13 |
| 7,610,512 B2 | 10/2009 | Gerber | |
| 7,617,073 B2 | 11/2009 | Trinon | |

(Continued)

*Primary Examiner* — Alan S Miller
(74) *Attorney, Agent, or Firm* — Fletcher Yoder PC

(57) ABSTRACT

A project management portal is disclosed that may include a graphical user interface (GUI) by which individuals internal and external to the enterprise may coordinate performance of tasks and communicate with one another to complete the project. The GUI may include a job list window that displays a plurality of selectable jobs, each corresponding to a job that has been created by a user, and a job details window that displays information associated with a job corresponding to a selected job within the job list window. The job details window may include any number of data entry fields that allow a job to be configured. In some embodiments, some jobs within a job list window may be dependent upon other jobs, such that data produced during performance of a first job acts as an input to be used during performance of a second job.

20 Claims, 11 Drawing Sheets

(56) References Cited

U.S. PATENT DOCUMENTS

| | | | |
|---|---|---|---|
| 7,640,548 B1* | 12/2009 | Yu | G06Q 10/10 718/106 |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,831,978 B2* | 11/2010 | Schaad | G06Q 10/06316 718/106 |
| 7,890,802 B2 | 2/2011 | Gerber | |
| 7,913,259 B2* | 3/2011 | Schmitt | G06F 11/3672 718/102 |
| 7,925,981 B2 | 4/2011 | Pourheidar | |
| 7,930,396 B2 | 4/2011 | Trinon | |
| 7,945,860 B2 | 5/2011 | Vambenepe | |
| 7,966,398 B2 | 6/2011 | Wiles | |
| 8,010,396 B2* | 8/2011 | Gura | G06Q 10/0631 705/7.12 |
| 8,051,164 B2 | 11/2011 | Peuter | |
| 8,151,261 B2 | 4/2012 | Sirota | |
| 8,224,683 B2 | 7/2012 | Manos | |
| 8,266,096 B2 | 9/2012 | Navarrete | |
| 8,302,096 B2* | 10/2012 | Schulz | G06Q 10/06 718/101 |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,646,093 B2 | 2/2014 | Myers | |
| 8,656,002 B1* | 2/2014 | Adogla | G06F 9/485 709/223 |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,223,628 B2* | 12/2015 | Rastogi | G06F 9/4881 |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 10,235,646 B2* | 3/2019 | Perry | G16H 40/67 |
| 2006/0107265 A1* | 5/2006 | Schulz | G06Q 10/06 718/100 |
| 2007/0150327 A1* | 6/2007 | Dromgold | G06Q 10/063118 705/7.17 |
| 2008/0112321 A1* | 5/2008 | Ricketts | G06Q 10/087 370/235 |
| 2008/0127041 A1* | 5/2008 | Gura | G06Q 10/06 717/101 |
| 2008/0229322 A1* | 9/2008 | Berstis | G06F 9/505 718/106 |
| 2009/0210282 A1* | 8/2009 | Elenbaas | G06Q 10/06 705/7.13 |
| 2009/0293074 A1* | 11/2009 | Rohwer | G06Q 10/06 719/328 |
| 2011/0321051 A1* | 12/2011 | Rastogi | G06F 9/4881 718/102 |
| 2012/0239451 A1* | 9/2012 | Caligor | G06Q 10/00 705/7.21 |
| 2013/0332210 A1* | 12/2013 | Wyganowski | G06Q 30/04 705/7.13 |
| 2014/0282199 A1* | 9/2014 | Basu | G06Q 10/0633 715/772 |
| 2015/0212776 A1* | 7/2015 | Uster | G06K 15/00 358/1.14 |
| 2016/0300178 A1* | 10/2016 | Perry | G06Q 10/063116 |
| 2016/0328683 A1* | 11/2016 | Palavalli | G06F 9/485 |
| 2017/0017522 A1* | 1/2017 | Daga | G06F 9/5066 |
| 2017/0242852 A1* | 8/2017 | Clain | G06F 9/451 |
| 2018/0181446 A1* | 6/2018 | Bequet | G06F 16/9024 |

* cited by examiner

FIG. 6

[Rotated screenshot of a "Close Task" form interface]

- CLOSE TASK-CLTASL0007648 — ... FOLLOW ▷  ✕  — 350
- DRAFT ✓ > READY ✓ > ASSIGNED ✓ > IN PROGRESS ✓ > PENDING REVIEW ✓ > PENDING APPROVAL ✓ > PENDING JE POSTING ✓ > COMPLETED ✓ > CANCELLED — 352

| Field | Value |
|---|---|
| NUMBER | CLTASK0007648 — 354 |
| *SHORT DESCRIPTION | TASK 2 — 356 |
| OWNER | 00FCMS UK USER — 358 |
| DESCRIPTION | |
| TASK TYPE | FP & A — 362 |
| STATE | COMPLETED — 364 |
| PARENT | CHEFUN0000010 — 366 |

Tabs: GENERAL INFORMATION | SLA | ACTIVITY | CONTROL MAPPING

- *CLOSE DAY: -1 — 360
- ONE TIME TASK ☐
- CORPORATE ☐
- MILESTONE ☐
- FINAL ☐
- NOT APPLICABLE ☐
- APPLICABLE MONTH(S)
- PERCENT COMPLETE: 100
- FUNCTION: ACCOUNTS PAYABLE

— 368

AUTHORIZATION
- REVIEW NEEDED ☐
- APPROVAL NEEDED ☐
- CONFIDENTIAL ☐
- REVIEWER(S)
- APPROVER(S)
- AUTHORIZED USER(S)

— 370

— 374

CLOSE TASKS (2) | APPROVERS
CLOSE TASKS GO TO [NUMBER ▽] SEARCH ... 1 TO 2 OF 2 ▷▷ ▫

PARENT=CLTASK0007648

| ▪NUMBER △ | ▪SHORT DESCRIPTION | ▪TASK TYPE | ▪STATE | ▪FUNCTION | ▪OWNER | ▪APPROVER(S) |
|---|---|---|---|---|---|---|
| CLTASK0007649 | TASK 2.1 | IA | COMPLETED | ACCOUNTS PAYABLE | 00FCMS UK USER | |
| CLTASK0007650 | TASK 2.2 | IA | COMPLETED | ACCOUNTS PAYABLE | 00FCMS US USER | |

— 372

ACTIONS ON SELECTED ROWS... ▽       ◁◁ ◁ 1 TO 2 OF 2 ▷ ▷▷

500

≡ LIST | RCTASK001125 ×  | + | ...

DETAILS | JB00123 ×

OPEN PO ACCRUALS REPORT
DETAILS  JOB PARAMETERS  JOB RUNS | SAVE | EXECUTE

502 — JOB PARAMETERS
LAST UPDATED 7m AGO | REFRESH PARAMETERS

504 — COMPANY CODE
BETWEEN  ▽  1000  2000
CONTAINS PATTERN  ▽  *AB

506 — ACCOUNTING PRINCIPLE
BETWEEN  ▽  1000  2000

508 — ACCRUAL TYPE
BETWEEN  ▽  1000  2000

510 — ACCRUAL CATEGORY
BETWEEN  ▽  1000  2000

512 — ACCRUAL NUMBER
BETWEEN  ▽  1000  2000

514 — KEY DATA FOR ACCRUALS
2019-04-01

FIG. 8

SYSTEMS AND METHOD FOR A PROJECT MANAGEMENT PORTAL

BACKGROUND

The present disclosure relates generally to tools for automated management of a project. Specifically, the present disclosure relates to software tools for automated performance of a series of tasks during the undertaking and completion of a project.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing-based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Within these computational contexts, starting and monitoring of individual tasks of a project, or jobs of a particular task within a project, may require logging into an enterprise resource planning (ERP) product and constantly monitoring progress of reports, programs, and jobs. Managing the undertaking and completion of a project by a team of people associated with an enterprise may be slowed down and made less efficient by necessitating dedicated startup and monitoring of individual tasks and/or jobs that make up the project. Delays may also result from task failures that occur without the user's knowledge and use substantial time before restart.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes a project management portal for completing a project or other series of tasks (e.g., a joint venture, collaborative project, financial close, audit, consulting, etc.) using a team of individuals associated with an enterprise. One or more of the tasks may include a set of one or more jobs. The project management portal may include a graphical user interface (GUI) by which individuals internal and external to the enterprise may coordinate performance of tasks and communicate with one another to complete the project. The GUI may include a job list window that displays a plurality of selectable jobs, each corresponding to a job that has been created by a user, and a job details window that displays information associated with a job corresponding to a selected job within the job list window. The job details window may include any number of data entry fields that allow a job to be configured. In some embodiments, some jobs within a job list window may be dependent upon other jobs, such that data produced during performance of a first job acts as an input to be used during performance of a second job. Further, completion of a first selected job may activate a follow-up job. The project management portal may allow for jobs to be scheduled, either on a one-time or recurring basis.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 illustrates an embodiment of a task window within the project management portal of FIG. 5, in accordance with aspects of the present disclosure;

FIG. 8 illustrates an embodiment of the job window of FIG. 7 in which a parameters tab has been selected, in accordance with aspects of the present disclosure;

DETAILED DESCRIPTION

Figure 1:
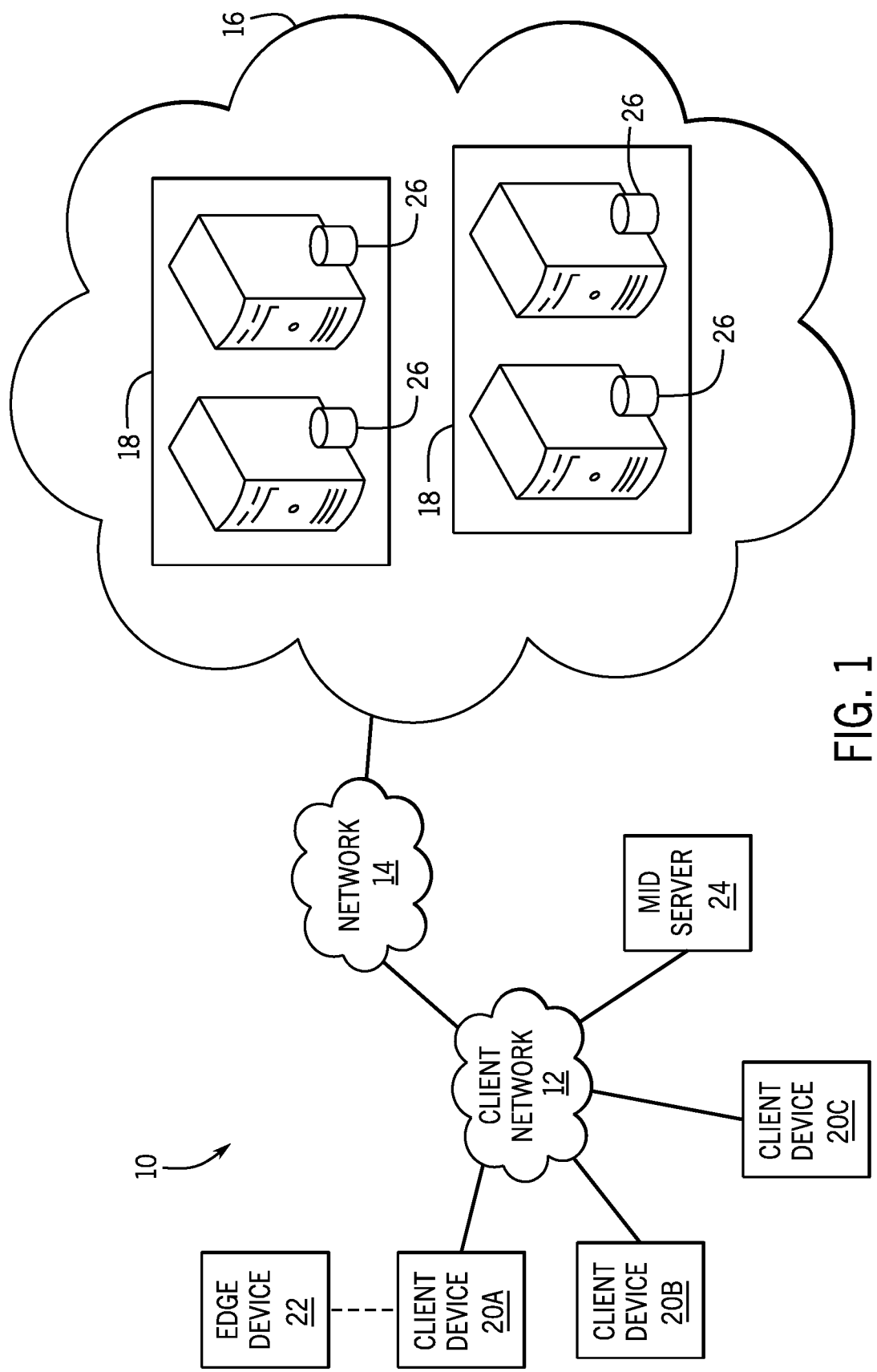
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

An enterprise may wish to complete a project or other series of tasks (e.g., a joint venture, collaborative project, financial close, audit, consulting, etc.) using a team of individuals that includes one or more individuals that are internal to the enterprise (e.g., employees of the enterprise) and one or more individuals that are external to the enterprise (e.g., contractors, consultants, vendors, partners, etc.). Each task may include any number of individual jobs (e.g., reports, journal entries, balance changes) to be performed. Accordingly, the disclosed techniques include a project management portal (e.g., a graphical user interface or GUI) by which individuals internal and external to the enterprise may coordinate performance of tasks and communicate with one another to complete the project. The GUI may include a task list window that displays a plurality of selectable task cards, each corresponding to a task that has been assigned to a user, and a task details window that displays information for the task corresponding to a selected task card within the a task list window. In some embodiments, some tasks may be dependent upon other tasks, such that data produced during performance of a first task is input or otherwise utilized during performance of a second task. Further, completion of a first selected task may activate a follow-up task. The project management portal may allow for tasks to be scheduled, either on a one-time or recurring basis. Further, the project management portal may allow for mapping various aspects of multiple enterprise resource planning (ERPs) products to facilitate the sharing of data, either between ERPs or between one or more ERPs and the project management portal. In some embodiments, some jobs may be dependent upon other jobs, such that data produced during performance of a first job is input or otherwise utilized during performance of a second job. Further, completion of a first selected job may activate a follow-up job. The project management portal may allow for jobs to be scheduled, either on a one-time or recurring basis.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
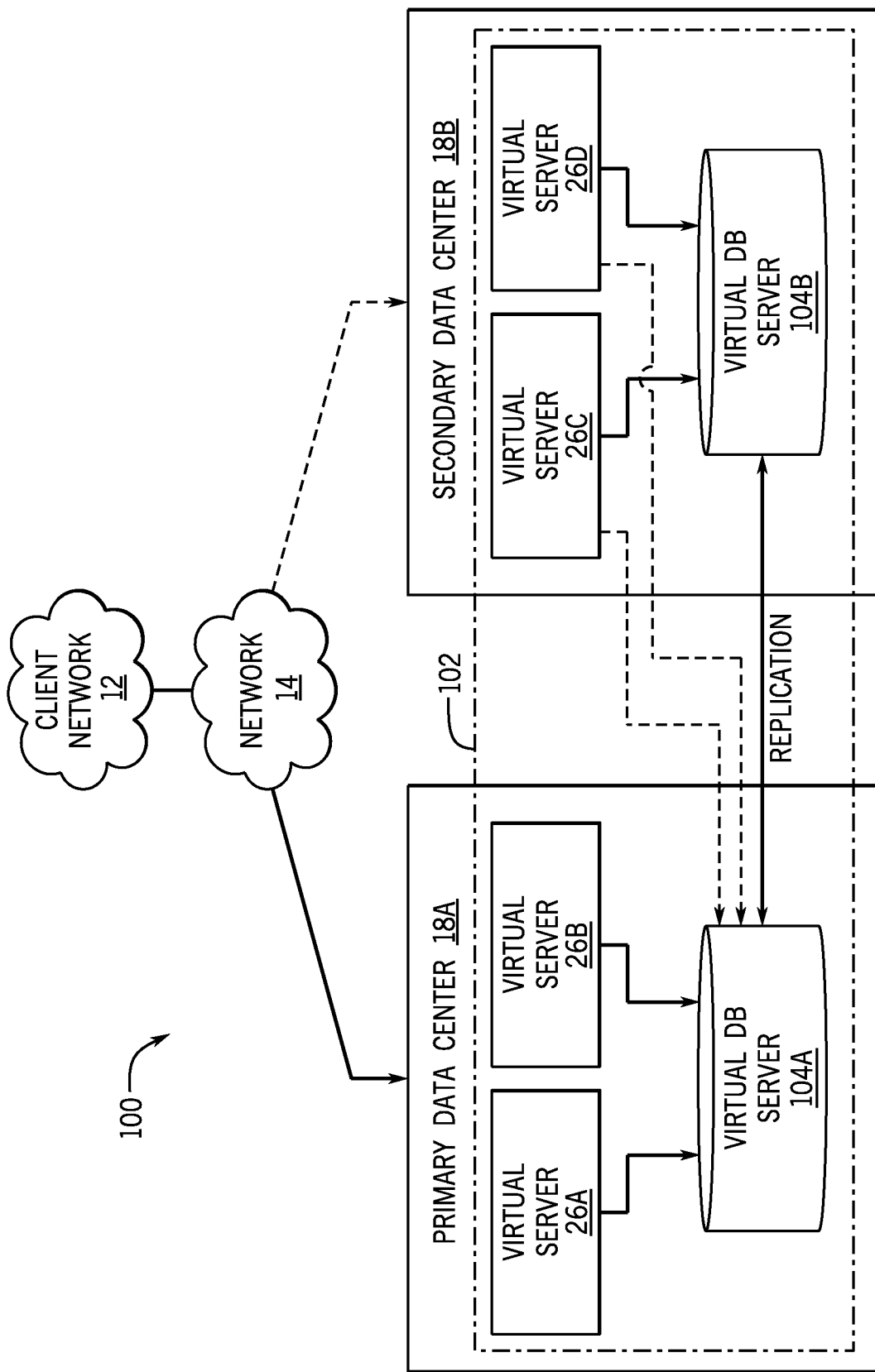
FIG. 2 is a schematic diagram of an embodiment of a multi-instance cloud architecture in which embodiments of the present disclosure may operate.

FIG. 2 is a schematic diagram of an embodiment of a multi-instance cloud architecture where embodiments of the present disclosure may operate. FIG. 2 illustrates that the multi-instance cloud architecture 100 includes the client network 12 and the network 14 that connect to two (e.g., paired) data centers 18A and 18B (such as for data redundancy and/or failover purposes) that may be geographically separated from one another. Using FIG. 2 as an example, network environment and service provider cloud infrastructure client instance 102 (also referred to herein as a client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 100 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
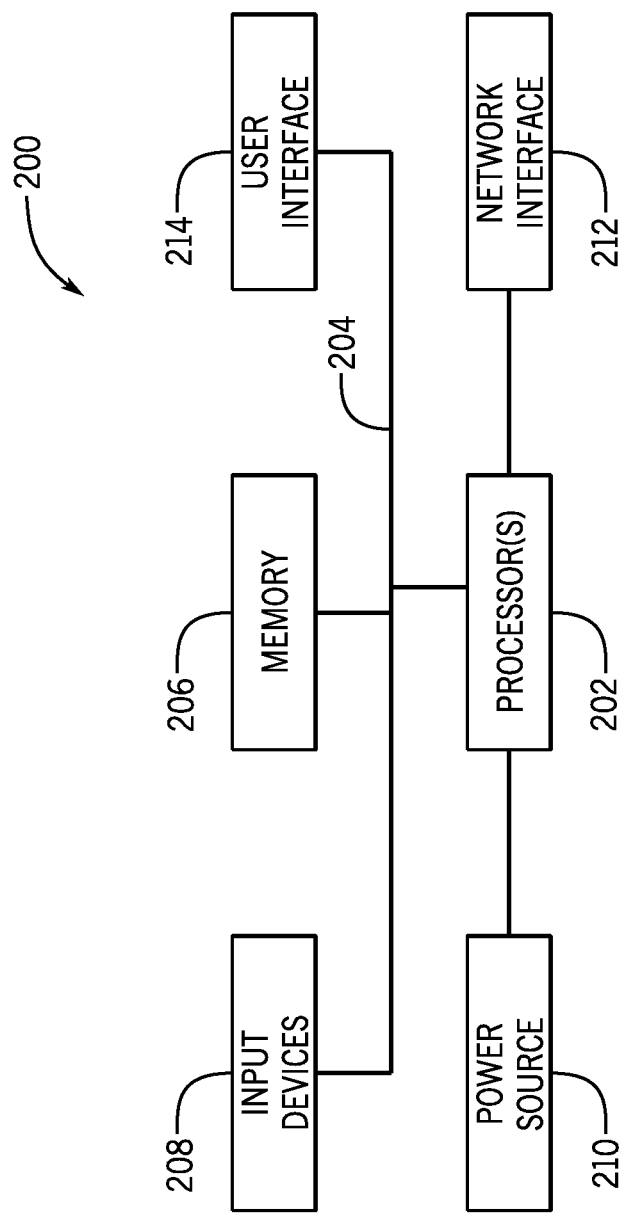
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
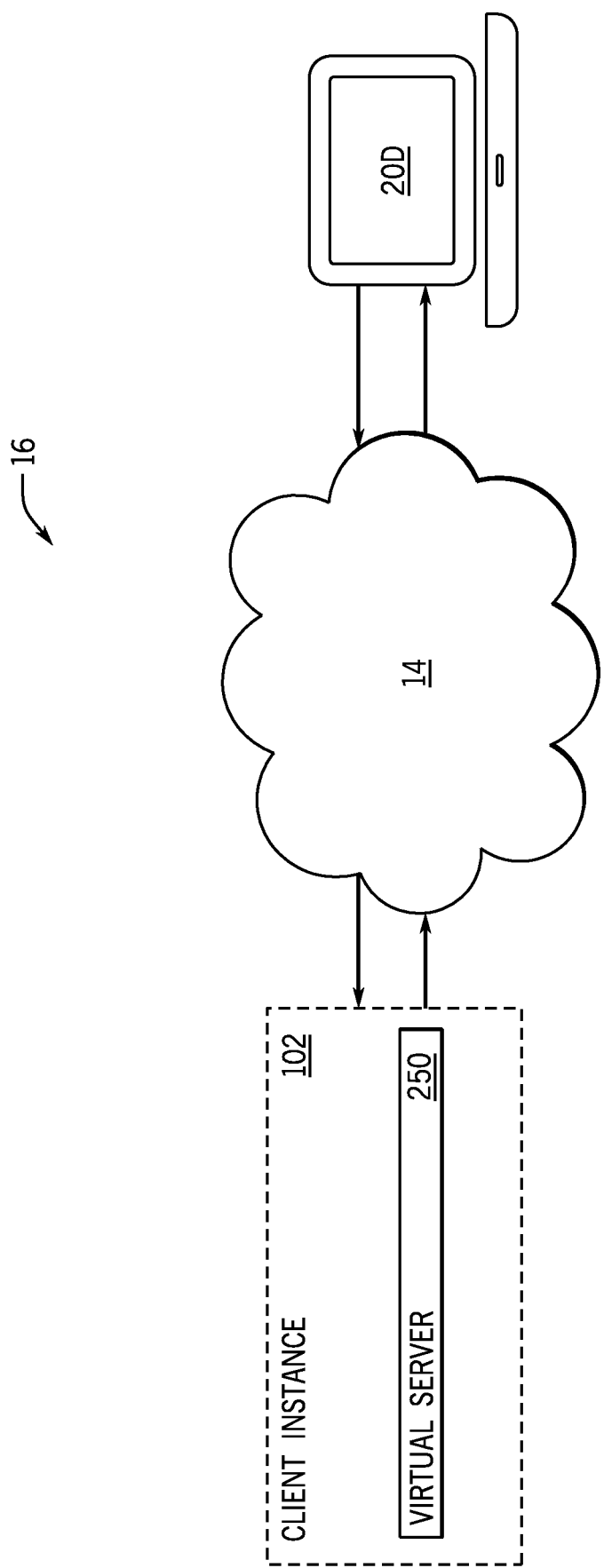
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 250 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
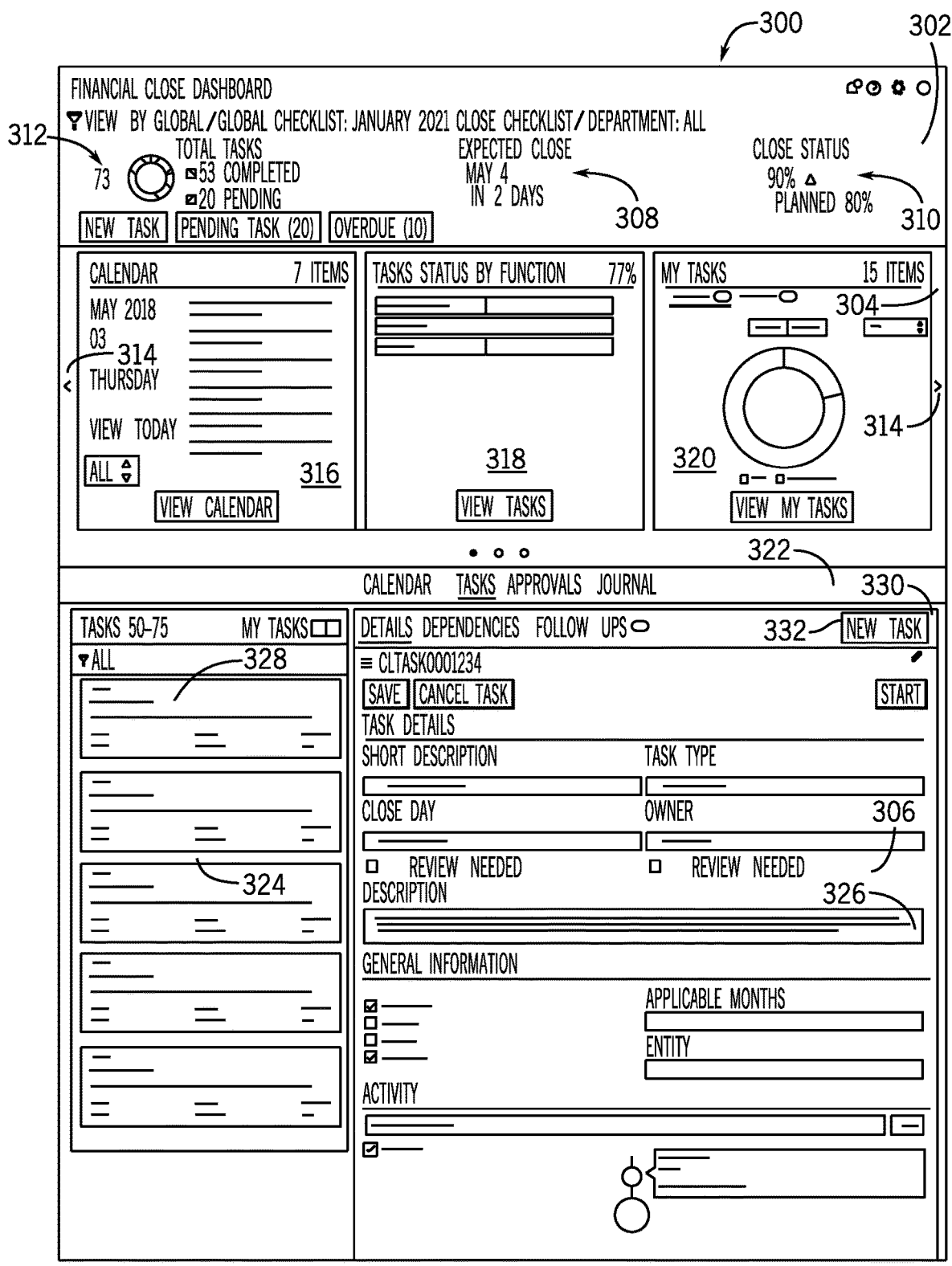
FIG. 5 illustrates an embodiment of a dashboard of a project management portal, in accordance with aspects of the present disclosure.

In some cases, an enterprise may wish to complete a project or other series of tasks (e.g., a joint venture, collaborative project, financial close, audit, consulting, etc.) using a team of individuals that may include one or more individuals that are internal to the enterprise (e.g., employees of the enterprise) and one or more individuals that are external to the enterprise (e.g., contractors, consultants, vendors, partners, etc.). Accordingly, FIG. 5 is a screen shot of a dashboard 300 within a project management portal (e.g., a graphical user interface or GUI) by which individuals internal and external to the enterprise may coordinate activities and communicate with one another to complete the project. As is described in more detail below, the project may include one or more tasks. One or more tasks within a project may include one or more jobs. For tasks with multiple jobs, the jobs may have a parent-child relationship or other dependency relationship such that outputs of a first job are used as inputs to a subsequent job. The system may be configured to automatically initiate, without any human intervention or interaction, the subsequent job using the outputs of the first job as inputs for the second job upon completion of the first job. Similarly, the system may also be configured such that, upon completion of a first task, a subsequent task is automatically initiated.

In the instant embodiment, the project management portal is being used to facilitate financial close at the end of an accounting period. However, it should be understood that the project management portal may be used to facilitate other projects that include tasks performed by or facilitated by individuals associated with an enterprise, such as a new product/service launch, rebranding, reorganization, a joint venture, a consulting project, etc. As shown, the dashboard 300 includes a top region 302, a middle region 304, and a bottom region 306.

The top region 302 provides a summary of the project. As shown, the top region 302 may include, for example, an indication of the projected project completion date 308, a percentage complete value 310, and a task summary 312. The projected project completion date 308 may display a projected or a scheduled completion date and/or a number of days until the projected or scheduled completion date. The percentage complete value 310 may display the percentage of project completion. The percentage complete may be based on time, tasks, weighted tasks, per-task time estimates, etc. In some embodiments, the percentage complete value 310 may also include a comparison of the current completion percentage to the planned completion percentage at the date in question. The task summary 312 may include an indication of the total number of tasks and an indication of the number of tasks that are completed, pending, overdue, follow-ups, etc. As shown, the task summary 312 may include a pie chart or some other graphical representation of the breakdown of tasks into various categories (e.g., not yet started, pending, completed, etc.).

The middle region 304 includes one or more widgets, which may be customizable by the user. As used herein, the term "widget" refers to a user interface element of a graphical user interface (GUI) that operate as a small, self-contained application or applet within the GUI. As such, a widget may be associated with instructions that are executed by a processor-based device to present data (e.g., a graph, plot, etc.) to the user, and to update the data (e.g., summary or graphic data) based on changes to the underlying data. Additionally, certain widgets can be configured by users to provide extended functionality that can be saved for later access and/or transferred to other users. In the instant embodiments, three widgets may be displayed at a time, in a horizontal row. The arrows 314 on either side of the middle region 304 indicate that the middle region may include more than three widgets. The user may then use the arrows 314 to control which widgets are displayed by the middle region 304 at a given time. In the instant embodiment, the displayed widgets include a calendar widget 316, a task status by function widget 318, and a "my tasks" widget 320. As shown, the calendar widget 316 displays the current date and all tasks and/or events listed for that day. The task status by function widget 318 breaks down tasks by type and then displays the status of tasks (e.g., pending or completed) within each task type. The "my tasks" widget 320 displays tasks assigned to the user. In the instant embodiment, the "my tasks" widget 320 includes a pie chart showing all tasks assigned to the user, according to different breakdowns. For example, in the embodiments shown in FIG. 5, the pie chart can toggle between task type and task status. As shown, each widget 316, 318, 320 includes a button (e.g., "view calendar", "view tasks", "view my tasks"), selectable by the user, to display more details about the underlying data. It should be understood, however, that the widgets shown in FIG. 5 (e.g., the calendar widget 316, the task status by function widget 318, and the "my tasks" widget 320) are merely examples and that the middle region may include other widgets as selected and customized by the user.

The bottom region 306 includes a row of tabs 322, selectable by the user, to control what is displayed in the bottom region 306. In the instant embodiment, the task tab 322 has been selected. When the task tab 322 is selected, the bottom region displays a task list window 324 and a task details window 326. As shown, the task list window 324 includes a column of stacked cards 328, each corresponding to a task. If the number of task cards 328 exceeds the number of cards that can be displayed within the task list window 324 at once, the task list window 324 may be scrollable.

Further, in some embodiments, the user may utilize a filtering feature to control which tasks cards 328 are displayed in the task list window 324 (e.g., show tasks that have not been completed). As shown, each task card 328 may display summary information about the task, such as the task type, the assignee, and assignor, the task name, a brief description, the completion date, etc. Additionally, in some embodiments, the task cards 328 may be displayed within the task list window 324 according to some kind of sorting operation (e.g., sort by due date, sort by type, sort by status, etc.).

When a task card 328 is selected from the task list window 324, the task details window 326 displays more detailed information about the task associated with the selected task card 328. If a user is external to the enterprise (e.g., a contractor, auditor, etc.), the task details window 326 may be configured to display a pared down version of the task information based upon the permissions of the user. The task details window 326 includes a row of tabs 330, selectable by the user, to control what is displayed within the task details window 326. As shown, when the task details tab 330 is selected, the task details window 326 may display data fields, such as short description, task type, due date, owner, detailed description, whether review is needed, whether the task is a one-time task or a recurring task, the schedule (if the task is a scheduled or recurring task), the applicable months of the task, the associated entity, work notes, a task timeline, activity, etc. The activity window may be used by the user, the task assignor, the task assignee, or other party to the task to provide portions of text to provide status updates, ask questions, provide explanations, etc. Accordingly, the activity window may be used in place of other communication channels (in person, via telephone, text message, email, a chat or message client, etc.) in order to keep a record of communication within the project management portal. In some embodiments, if a user has authority to edit a task, the user may edit the data fields displayed in the task details tab 330.

The applicable months field may be used to schedule one-off events and/or recurring events. As such, the project management portal may include the capability to schedule a task or a group of tasks to occur on a recurring basis (e.g., daily, weekly, monthly, quarterly, annually, etc.). Accordingly, the user may utilize the applicable months field to specify a date on which a task is created or activated and a period after which the task recurs.

As shown, other available task detail tabs 330 may include a dependencies tab and a follow-ups tab. When the dependencies tab is selected, the task details window 326 may display the tasks that depend from the selected tasks and/or the task or tasks from which the selected task depends. Dependency between tasks may be defined as a parent-child relationship in which one or more tasks are parents and one or more tasks are children such that the inputs of some tasks are based upon the outputs of other tasks. Dependency relationships may be stacked up to string together any number of tasks via multiple parent-child relationships. In some embodiments, data generated or output during performance of a first task may act as an input or be otherwise used in performance of a second task. In one embodiment, a first application or software module may be used to perform tasks that, upon completion, cause a related task in a second, different application or software module to be performed (e.g., completed). By way of example, in the context of Financial Close Automation (FCA), certain tasks may be performed regularly as part of closing out and/or reconciling financial records for a respective time frame (e.g., a month, a quarter, fiscal year, and so forth). As used herein, such a FCA, or the aspect of such a suite related to closing out or reconciling records for a period of time, may also be referred to as a closing application. Along these lines, completion of a first task may cause the first task to be marked as completed or removed from a user's task list window 324. Completion of the first task may cause a second task to be created or activated and added to the task list window 324 of either the user or a different user. Accordingly, it should be understood that parent and child tasks may be assigned to different users such that completion of the parent task by a first user causes the child task to appear in the task list window 324 of a second user.

When the follow-ups tab is selected, the task details window 326 may display any follow-up tasks associated with the selected task. Similar to dependent tasks, the project management portal may also have a capability to create follow-up tasks. For example, completion of a first task may trigger creation of a follow up task. Further, if the user needs additional information to perform a task, or needs another user to take some action before a task can be performed, a follow-up task may be created and assigned to the other user. Upon creation of the follow-up task by the user, the follow-up task may appear in the task list window 324 of the other user for completion. In some embodiments, the project management portal may allow for subtasks to be created within a task.

In some embodiments, the user may select the new task button or otherwise select a task to edit, causing the dashboard to open a window to create a new task or edit an existing task. FIG. 6 illustrates an embodiment of a task window 350. As shown, the task window 350 includes a task status bar 352 that tracks the status of a task from draft to completion. In the embodiment shown in FIG. 6, the status bar 352 includes indicators for each status, disposed in chronological order as the task moves from creation to completion. As the task moves through a status, a check mark, or some other indicator, may appear in the status indicator associated with the status. Further, the status indicator associated with the current status of the task may be shaded in order to indicate the current status of the task. For example, in the embodiment shown in FIG. 6, the task has been completed, so the "completed" status indicator is shaded (or otherwise visually modified or enhanced) and the status indicators to the left of the "completed" status indicator include check marks. It should be understood that the status indicators in the task status bar 352 shown in FIG. 6 are merely examples and that status indicators may vary from embodiment to embodiment. For example, in some embodiments, the status indicators of the task status bar 352 may be different for different task types or for the different projects being undertaken using the project management portal. Further, in some embodiments, the status indicators of the task status bar 352 may be customizable by the user.

Below the task status bar 352, the task window 350 includes a number of data fields that define the task. For example, the task window 350 includes a task name/number field 354, a short description field 356, an owner field 358, a description field 360, a task type field 362, a state field 364, and a parent field 366. The task name/number field 354 includes the name and/or number assigned to the task. The short description field 356 includes a short description of the task. The owner field 358 identifies the user that is designated as the owner of the task. The description field 360 provides a longer description of the task. The task type field 362 identifies the type of the task. The state field 364 identifies the status of the task, which is also communicated via the task status bar. The parent field 366 identifies one or more parent tasks of the selected task, if any.

As shown in FIG. 6, the task window 350 also includes a general information window 368, which may include a number of additional data fields and/or checkboxes. For example, the general information window 368 may indicate whether the selected task is a one-time task or a repeating task, a corporate task, a milestone task, and/or a final task. Further, the general information window 368 may indicate the percentage of the task complete and the function associated with the task. The general information window 368 also includes an authorization region 370, which indicates whether review of the task is needed, whether approval of the task is needed, and whether the task is confidential. In some embodiments, the authorization region 370 may also identify the reviewing users, the approving users, and/or the authorized users associated with the selected task. As shown in FIG. 6, in some embodiments, the user may use tabs to replace the general information window with a service level agreement (SLA) window, an activity window, or a control mapping window. As previously described, the activity window may be used by the task assignee, the task assignor, or other individuals capable of viewing the task, to exchange communication about the performance of the task.

Disposed below the general information window 368 is a related tasks window 372. The related tasks window 372 may list one or more tasks that are related to the selected task. For example, in the embodiment shown in FIG. 6, the related tasks window 372 includes a list of tasks that are children of the selected task. However, it is also envisaged that the related tasks window 372 could display tasks that are parents of the selected task. In some embodiments, a parent-child relationship may be used to define a chronological order of tasks. That is, a parent task must be performed before its child task. However, performance of a parent task may also trigger creation and/or activation of a child task. In some embodiments, outputs generated by a parent task or generated during performance of a parent task may be used as inputs for a child task. As shown in FIG. 6, the user may select an approvers tab 374 to replace the related tasks window 372 with an approvers window that lists the users authorized to approve the task and/or users that have approved the task.

Returning to FIG. 5, the tabs available in the row of tabs 322 may vary based on the particular project management portal being used, as well as any add-ons or integrations with other software packages or tools. For example, in the embodiment shown in FIG. 5, the project management portal is part of a financial close automation (FCA) system.

Figure 7:
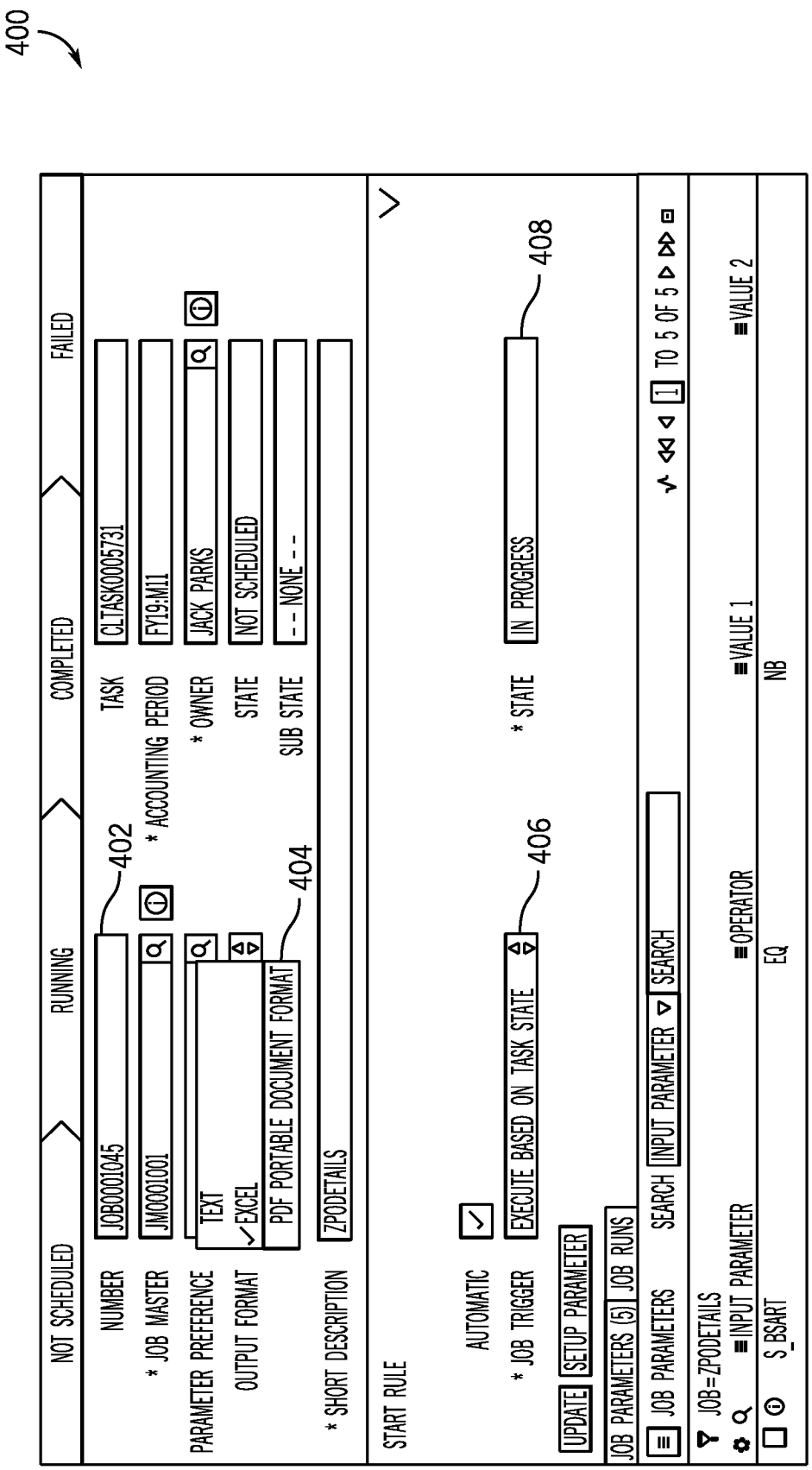
FIG. 7 illustrates an embodiment of a job window within the project management portal of FIG. 5, in accordance with aspects of the present disclosure.

Each task performed may include any number of individual jobs (e.g., reports, journal entries, balance changes, etc.). In some embodiments, the user may select a new job button or otherwise select a job to edit, causing the dashboard to open a window to create a new job or edit an existing job associated with a task. FIG. 7 illustrates an embodiment of a job details window 400. As shown, the job details window 400 includes a number of data fields that define the respective job. For example, the job details window 400 may include a job name/number field 402, an output format field 404, a job trigger field 406, and a status field 408. The job name/number field 402 may include a name and/or number assigned to the job. The status field 408 may identify a status of the job and may track the status of the job from start to completion. The output format field 404 may include a set of output formats for data generated during performance of the job. For example, the output format may be a text file, portable document format file, and/or a spreadsheet. The job trigger field 406 may indicate a trigger for starting the job. For example, the job may trigger based on an "assigned" status of the task associated with the job. As shown in the embodiment in FIG. 7, the job is currently running and the "in progress" status indicator is depicted. In some embodiments, the job details window 400 may periodically request updates from the ERP about the job status. For example, the job details window 400 may request job status updates in ten, fifteen, twenty, or thirty minute intervals. In certain embodiments, any number of jobs associated with a task may be triggered to execute in parallel. Additionally or alternatively, a follow-up job may trigger based on completion of a previous job. In some embodiments, the user may select a preconfigured job by entering an associated job master code associated with the ERP. In some embodiments, output generated by a completed job may be sent to any number of individuals. For example, the job details window may include a data entry field for a user to select individuals to receive generated output for the associated job.

Each job may include any number of parameters which allow a user to configure the job. FIG. 8 illustrates an embodiment of the job details window 400 of FIG. 7 in which a parameters tab has been selected. When the parameters tab has been selected, the job details window 500 may display a set of configurable job parameters 502 for the selected job, such as a company code parameter 504, an accounting principle parameter 506, an accrual type parameter 508, an accrual category parameter 510, an accrual number parameter 512, and a key date parameter 514. Each configurable job parameter may display summary information about the parameter, such as the parameter type, an operator, and one or more data entry fields. In certain embodiments, the configurable job parameters may be default job parameters. For example, the ERP may provide default job parameters based on the job type. The company code parameter 504 may include a selectable range of company codes. The company code parameter 504 may also filter company codes based on a selected pattern. The key date parameter 514 may include a selectable date for execution of the job. In certain embodiments, the selectable date may be a periodically occurring date. For example, the key date parameter 514 may be the first day of an accounting period, the last day of an accounting period, or the first day of a closing period. Alternatively, the key date parameter 514 may be a current date. Additionally or alternatively, the set of configurable job parameters 502 may be stored and may be used for any number of selected jobs. For example, the job details window 500 may include a selectable set of configurable job parameters stored in a database associated with the FCA system. In certain embodiments, the selectable set of configurable job parameters may be associated with a selected job. For example, the job details window 500 may automatically configure the set of job parameters 502 based on a stored set of job parameters associated with a selected job.

Figure 9:
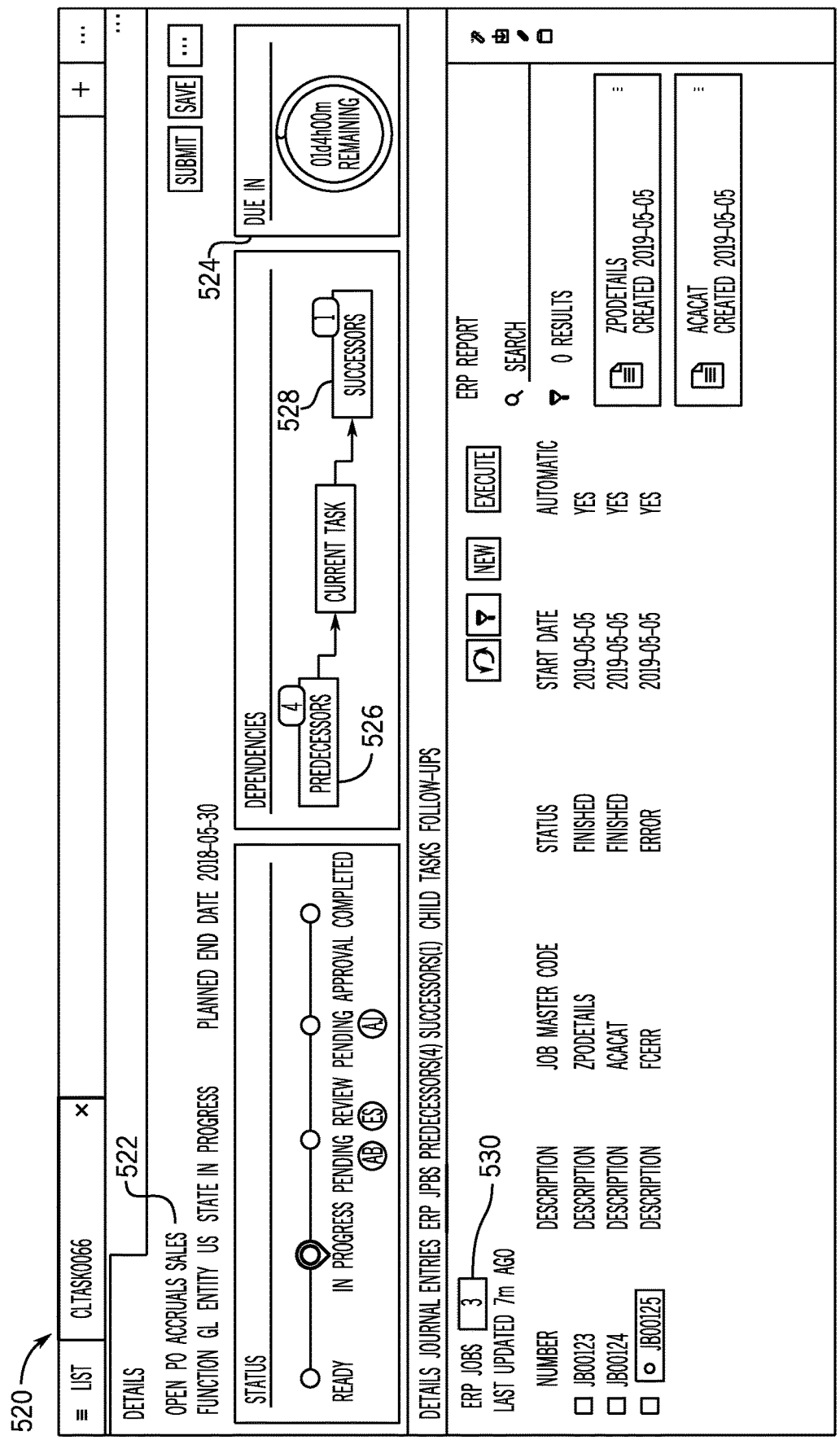
FIG. 9 illustrates an embodiment of a dashboard of FIG. 5 in which an overview tab has been selected, in accordance with aspects of the present disclosure.

In some embodiments, the user may select an overview tab for a task. FIG. 9 illustrates an embodiment of a task window 300 of FIG. 5 in which an overview tab 520 has been selected. When the overview tab 520 has been selected, the task window 300 may include fields for a task name 522, a task status 524, a related task bar, and a job list window 530. The task status 524 may track the status of a task from draft to completion. The task status 524 may display an amount of time remaining to complete the task. The related task bar may list one or more tasks that are related to the selected task. For example, in the embodiment shown in FIG. 9, the related task bar includes a number of parent tasks 526 and a number of child tasks 528. The job list window 530 may list one or more jobs associated with a task. In some embodiments, the user may select and/or change dependencies for jobs in the job list window 530. The job list window 530 may include a number of data fields, such as a job name/number, a short description, a job code, a job status, a start date, an end date, a trigger condition, and any other suitable job descriptors for each job associated with the task. The job list window 530 may also indicate an error associated with a job. In certain embodiments, a notification may be sent to a user associated with the job when an error occurs. For example, a message indicative of the error may be generated and may be sent to a user associated with the job.

Additionally or alternatively, the project management portal may also be configured to integrate with one or more enterprise resource planning (ERP) products. For example, different ERPs may be preferred for different functionality or reporting, by different organizations of the enterprise, for use in different geographic reporting regions because of different features they provide in those regions, and so forth.

In some embodiments, the project management portal may function as a normalizing top-layer that creates and/or maintains an underlying set of data commonly used by the various ERP platforms and translates or wraps the maintained data for use by the differing ERP platforms in a way that is transparent to the user. In this manner, the project management portal may function as a single gateway by which a user interacts with or updates multiple ERP platforms without having to individually manipulate or interact with each ERP platform, with the project management portal translating, based upon known ERP configurations and data formatting preferences, the stored data needed by each ERP platform to service a given request by a user or update a journal entry or other record. Thus, the user may, via the project management portal, send data or request reports from different ERP packages used by the user's organization, with the project management portal parsing the data and/or formatting communications for each respective ERP package such that the user need only be familiar with the project management portal commands and interface. Alternatively, work performed on the project management portal, such as performing a monthly closing operation on an account, may be seamlessly and transparently updated to each ERP package used by the client without logging into or working in the ERP package itself. For example, if a user has multiple different ERP or multi-ERP instances in their landscape, the user can perform their work in the single project management portal and all the journal entries made using the project management portal may be automatically posted in the ERP packages used by the client.

Figure 10:
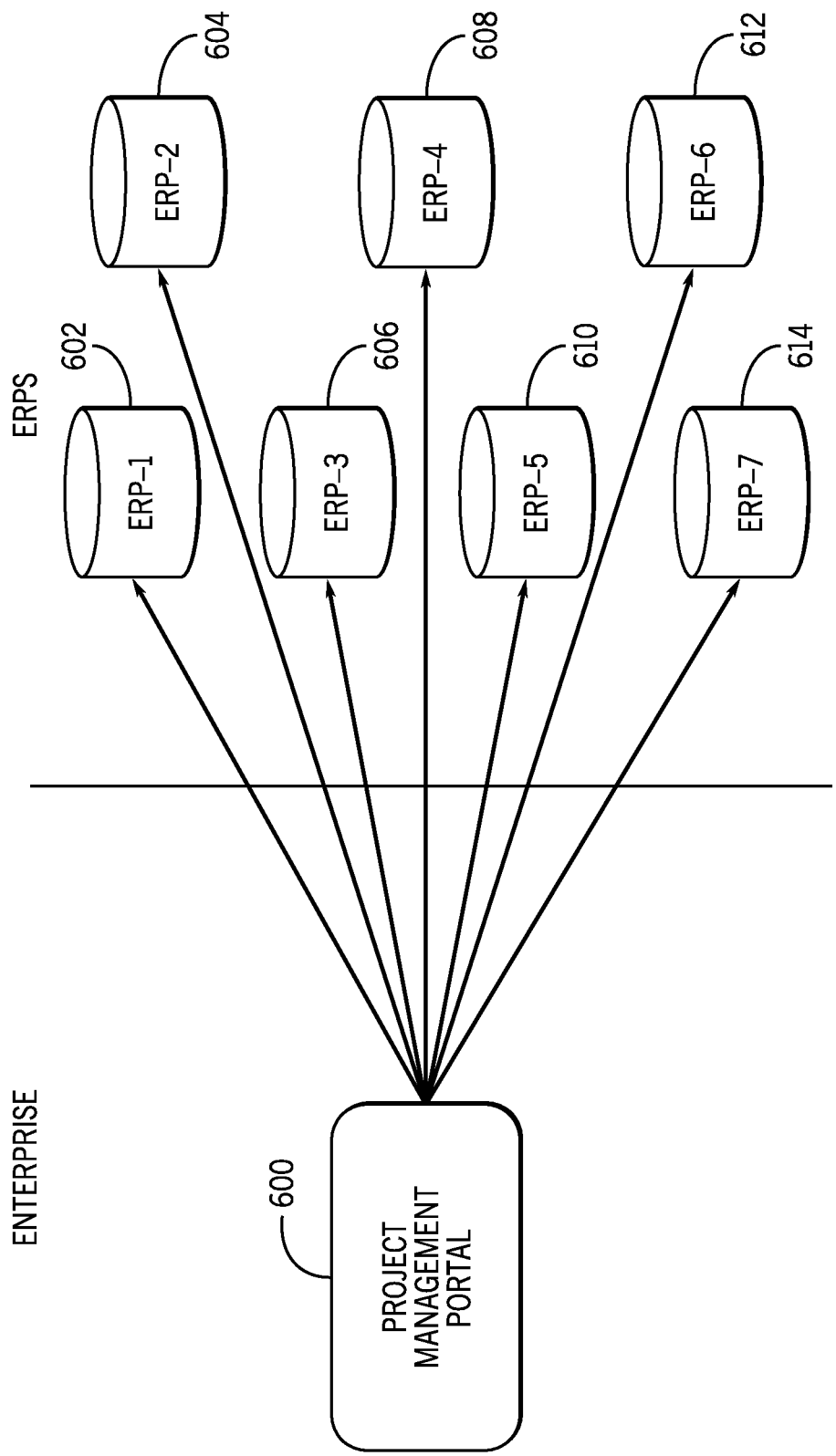
FIG. 10 illustrates how the project management portal of FIG. 5 may be configured to integrate with multiple enterprise resource planning products (ERPs), in accordance with aspects of the present disclosure.

FIG. 10 illustrates how a project management portal 600 implemented by an enterprise may be configured to integrate with multiple ERPs (e.g., ERP-1 602, ERP-2 604, ERP-3 606, ERP-4 608, ERP-5 610, ERP-6 612, ERP-7 614, etc.). For example, the project management portal may be part of an FCA system and may be configured to integrate with various ERPs, such as SAP, PEOPLESOFT, ORACLE, MICROSOFT DYNAMICS, NET SUITE, JD EDWARDS, etc. The enterprise may utilize different ERPs for different aspects of its operations. For example, the enterprise may utilize ERP-1 602 for procurement, ERP-2 604 for production, ERP-3 606 for distribution, ERP-4 608 for accounting, ERP-5 610 for human resources, ERP-6 612 for customer service, and ERP-7 614 for sales. The project management portal may be configured to integrate with some or all of the various ERPs in order to facilitate completion of a project (e.g., a financial close). For example, the project management portal may map various aspects (e.g., users, roles, tasks, data, services roles, etc.) between one or more ERPs and the project management portal, or between ERPs.

Figure 11:
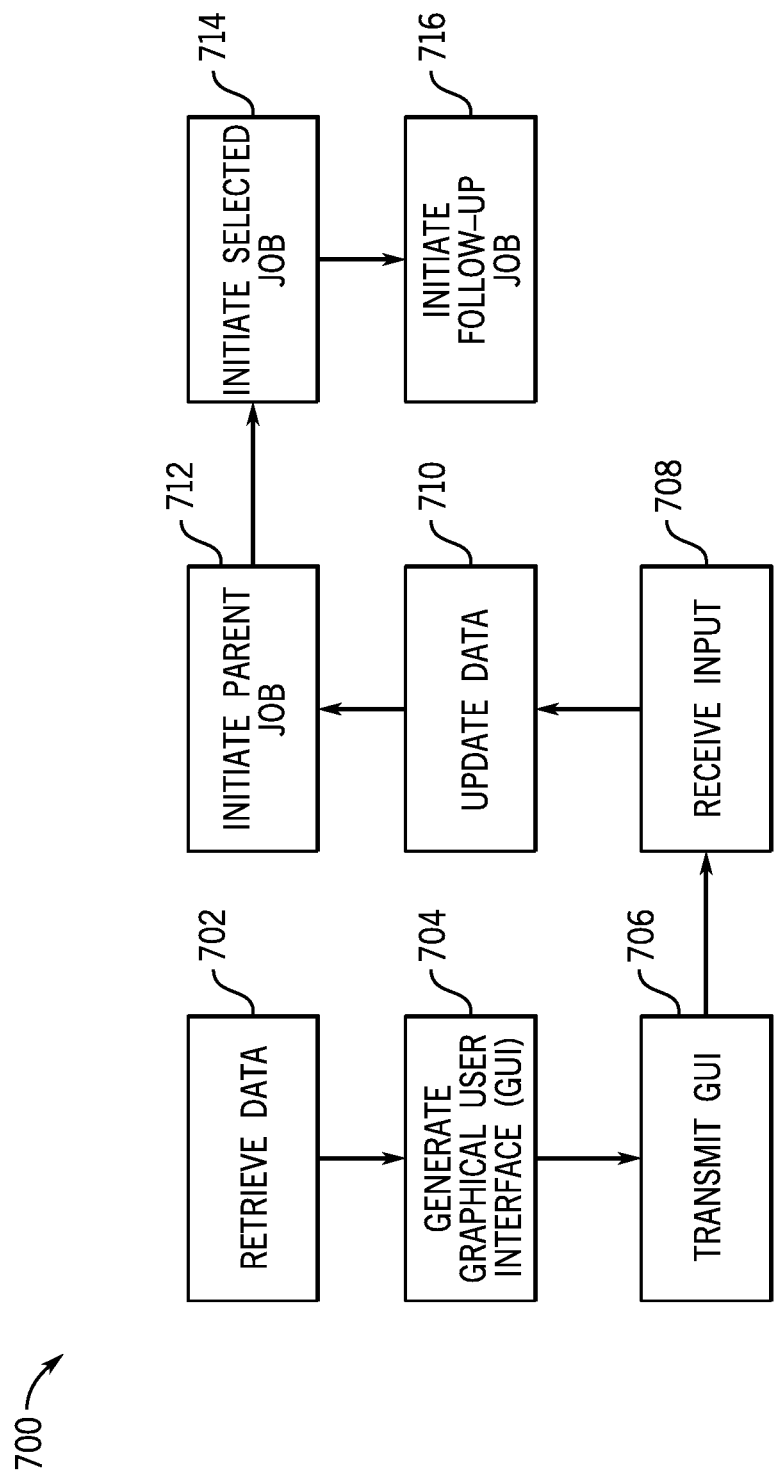
FIG. 11 illustrates a flowchart for a process for managing job dependency relationships, in accordance with aspects of the present disclosure.

With the preceding in mind, FIG. 11 illustrates a flow diagram for a process 700 for managing job dependency relationships for a set of jobs using a project management portal, such as the project management portal of FIG. 5, according to embodiments of the present disclosure. While the process 700 is described as being performed by the project management portal of FIG. 5, it should be understood that the process 700 may be performed by any suitable financial close automation (FCA) system that may control and/or communicate with components of an enterprise resource planning product. Furthermore, while the process 700 is described using steps in a specific sequence, it should be understood that the present disclosure contemplates that the described steps may be performed in different sequences than the sequence illustrated, and certain described steps may be implemented by executing instructions stored in a tangible, non-transitory, computer-readable medium using any suitable processing circuitry.

In this process 700, a FCA system retrieves data (step 702) from a local source, a source on the network, or from one or more ERPs. In certain embodiments, the data may include task data and/or job data. The job data may include a set of jobs associated with a task. In some embodiments, the job data may include a set of default parameters corresponding to each job. Different ERPs may be preferred for different functionality or reporting, by different organizations of the enterprise, for use in different geographic reporting regions because of different features they provide in those regions, and so forth. The enterprise may also utilize different ERPs for different aspects of its operations. For example, the enterprise may utilize a first ERP for procurement, a second ERP for production, a third ERP for distribution, a fourth ERP for accounting, a fifth ERP for human resources, a sixth ERP for customer service, a seventh ERP for sales, and so forth. The project management portal dashboard of the FCA system may be configured to integrate with one or more of the various ERPs in order to facilitate job dependency relationship management.

In certain embodiments, the FCA system may function as a normalizing top-layer that creates and/or maintains an underlying set of data commonly used by one or more of the ERPs. In this manner, the FCA dashboard may function as a single gateway by which a user interacts with or updates one or more ERPs without having to individually manipulate or interact with each ERP. Thus, the user may, via the project management portal dashboard, request reports from one or more ERPs used by the user's organization, with the FCA system parsing the data and/or formatting communications for each respective ERP such that the user need only be familiar with the project management portal dashboard commands and interface. Alternatively, work performed on the project management portal dashboard, such as managing job dependency relationships, may be performed without logging into or working in the ERP package itself. For example, if a user has multiple different ERP or multi-ERP instances in their landscape, the user can perform their work in the project management portal dashboard and all the journal entries made using the project management portal dashboard may be automatically posted in the ERP packages used by the client.

At step 704, the FCA system generates a graphical user interface (GUI). The GUI may include a job list window that includes a listing of any number of jobs associated with a task. The GUI may also include a job detail window that includes any number of data fields associated with a selected job from the listing. At step 706, the FCA system may transmit the GUI for display by any suitable electronic display associated with the FCA system.

At step 708, the FCA system may receive a user input. In certain embodiments, the user input may be received via the job detail window. The user input may define a dependency relationship between the selected job and a parent job. In this manner, performance of the parent job may generate a job output, upon which a job input for the selected job is based. In certain embodiments, a user input may define a dependency relationship between the selected job and a follow-up job. In this manner, performance of the selected job may generate another job output, upon which another job input for the follow-up job is based. In other embodiments, the user input may define or modify parameters of one or more jobs.

At step 710, the FCA system may update the retrieved data. For example, the FCA system may update retrieved job data to include user input associated with a dependency relationship between jobs or one or more parameters associated with one or more jobs. The FCA system may update the GUI to provide an indication of the dependency relationship between the selected job and the parent job. For example, the FCA system may update at least one of the plurality of data entry fields to provide an indication of the dependency relationship.

At step 712, the FCA system may initiate the parent job. For example, the FCA system may request a report, initiate a journal entry, determine balance changes, or any other suitable job. At step 714, the FCA system may initiate the selected job. For example, the FCA system may initiate the selected job in response to completion of the parent job. In certain embodiments, an input associated with the selected job may be based on an output of the parent job. At step 716, the FCA system may initiate the follow-up job. For example, the FCA system may initiate the follow-up job in response to completion of the selected job. In certain embodiments, an input associated with the follow-up job may be based on an output of the selected job.

The present disclosure includes a project management portal for managing dependency relationships for a series of jobs associated with one or more tasks. The project management portal may include a graphical user interface (GUI) by which individuals internal and external to the enterprise may coordinate performance of tasks and communicate with one another to complete the project. The GUI may include a job list window that displays a plurality of selectable jobs, each corresponding to a job that has been created by a user, and a job details window that displays information associated with a job corresponding to a selected job within the job list window. The job details window may include any number of data entry fields that allow a job to be configured. In some embodiments, some jobs within a job list window may be dependent upon other jobs, such that data produced during performance of a first job acts as an input to be used during performance of a second job. Further, completion of a first selected job may activate a follow-up job. The project management portal may allow for jobs to be scheduled, either on a one-time or recurring basis. Further, in some embodiments, the project management portal may be configured to integrate with one or more enterprise resource planning (ERP) products. Specifically, the project management portal may allow for mapping various aspects of multiple ERPs to facilitate the sharing of data, either between ERPs or between one or more ERPs and the project management portal.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a processor;
a memory storing instructions that, when executed by the processor, cause the processor to perform operations comprising:
retrieving job data representative of a plurality of jobs associated with a task;
generating a graphical user interface (GUI) comprising:
a job list window comprising a listing of the plurality of jobs associated with the task;
a job detail window comprising a plurality of data fields associated with a selected job from the listing of the plurality of jobs associated with the task wherein the plurality of data fields comprises a job trigger field that specifies a trigger condition for starting the selected job;
transmitting the GUI for display;
receiving a user input, via the job detail window, defining a dependency relationship between the selected job and a parent job, such that performance of the parent job generates a job output, upon which a job input for the selected job is based;
updating the job data to reflect the dependency relationship; and
automatically initiating, in response to completion of the parent job and satisfaction of the trigger condition, the selected job using the job input, wherein the job input is based on the job output of the parent job.

2. The system of claim 1, the operations comprising automatically initiating, in response to completion of the selected job, a follow-up job.

3. The system of claim 1, wherein the plurality of data fields displayed within the job detail window comprises an output format field defining an output format for the selected job.

4. The system of claim 1, wherein the selected job is configured to recur on a scheduled basis.

5. The system of claim 1, the operations comprising:
initiating the parent job; and
generating the job output of the parent job upon completion of the parent job.

6. The system of claim 1, the operations comprising receiving, from a computing device in communication with the system, the job output of the parent job.

7. The system of claim 1, the operations comprising receiving, via the job detail window, a set of job parameters corresponding to one or more default job parameters associated with the selected job wherein the set of job parameters are configurable.

8. The system of claim 1, the operations comprising:
receiving a second user input via the job list window, wherein the second user input corresponds to a selection of a predefined job, and wherein a set of default job parameters are associated with the predefined job; and
populating the plurality of data fields with the set of default job parameters.

9. A method, comprising:
retrieving, via a processor, task data representative of a plurality of tasks, including a first task, wherein the first task is associated with a plurality of jobs;
generating, via the processor, a graphical user interface (GUI) comprising:
a job list window comprising a listing of the plurality of jobs associated with the first task;
a job detail window comprising a plurality of data fields associated with a selected job from the listing of the plurality of jobs associated with the first task, wherein the plurality of data fields comprises a job trigger field that specifies a trigger condition for starting the selected job;
transmitting the GUI for display;
receiving a user input, via the job detail window, defining a dependency relationship between the selected job and a parent job, such that performance of the parent job generates a job output, upon which a job input for the selected job is based;
updating the task data to reflect the dependency relationship; and
automatically initiating, in response to completion of the parent job and satisfaction of the trigger condition, the selected job using the job input, wherein the job input is based on the job output of the parent job.

10. The method of claim 9, wherein the trigger condition is associated with an associated task.

11. The method of claim 9, comprising:
initiating the parent job; and
generating the job output of the parent job upon completion of the parent job.

12. The method of claim 9, comprising receiving, from a computing device in communication with the processor, the job output of the parent job.

13. The method of claim 9, comprising automatically initiating, in response to completion of the selected job, a follow-up job.

14. The method of claim 9, comprising:
receiving a second user input via the job list window, wherein the second user input corresponds to a selection of a predefined job; and
retrieving a set of default job parameters associated with the predefined job.

15. A non-transitory, tangible, computer readable medium comprising instructions that, when executed by a processor, causes the processor to perform operations comprising:
retrieving job data representative of a plurality of jobs associated with a task;
generating a graphical user interface (GUI) comprising:
a job list window comprising a listing of the plurality of jobs associated with the task;
a job detail window comprising a plurality of data fields associated with a selected job from the listing of the plurality of jobs associated with the task, wherein the plurality of data fields comprises a job trigger field that specifies a trigger condition for starting the selected job;
transmitting the GUI for display;
receiving a user input, via the job detail window, defining a dependency relationship between the selected job and a parent job, such that performance of the parent job generates a job output, upon which a job input for the selected job is based;
updating the job data to reflect the dependency relationship; and
automatically initiating, in response to completion of the parent job and satisfaction of the trigger condition, the selected job using the job input, wherein the job input is based on the job output of the parent job.

16. The non-transitory, tangible, computer readable medium of claim 15, wherein the operations comprise receiving a second user input, via the job detail window, defining a second dependency relationship between the selected job and a follow-up job, such that performance of the selected job generates a second job output, upon which a second job input for the follow-up job is based.

17. The non-transitory, tangible, computer readable medium of claim 15, wherein the operations comprise retrieving a set of default job parameters associated with the selected job from an enterprise resource planning product (ERP).

18. The non-transitory, tangible, computer readable medium of claim 15, the operations comprising:
initiating the parent job; and
generating the job output of the parent job upon completion of the parent job.

19. The non-transitory, tangible, computer readable medium of claim 15, wherein the selected job is configured to recur on a scheduled basis.

20. The non-transitory, tangible, computer readable medium of claim 15, the operations comprising:
receiving an input indicating that the selected job has an error; and
generating a message indicative of the error and the selected job.

* * * * *